W. C. GUNNELL.
TIRE DEFLATING TOOL.
APPLICATION FILED AUG. 12, 1914.

1,155,919.

Patented Oct. 5, 1915.

Witnesses

Inventor
W. C. Gunnell
By
Attorney

UNITED STATES PATENT OFFICE.

WILLIAM C. GUNNELL, OF CADIZ, OHIO.

TIRE-DEFLATING TOOL.

1,155,9/7

Specification of Letters Patent.   Patented Oct. 5, 1915.

Application filed August 12, 1914.   Serial No. 856,451.

*To all whom it may concern:*

Be it known that I, WILLIAM C. GUNNELL, a citizen of the United States, residing at Cadiz, in the county of Harrison and State of Ohio, have invented certain new and useful Improvements in Tire-Deflating Tools; and I do hereby declare the following to be a full, clear, and exact description of the invention, such as will enable others skilled in the art to which it appertains to make and use the same.

This invention relates to devices for deflating pneumatic tires, and one of the principal objects of the invention is to provide a clasp of simple construction to be attached to the threaded end of the nipple and for holding the check valve unseated so that the air from the tire will escape.

Another object of the invention is to provide a simple clasp to be connected to a nipple for holding the valve unseated, said clasp being made of two parts having a projecting integral member for holding the valve unseated, said clasp having a spring to hold the jaws connected with the nipple.

Figure 1:
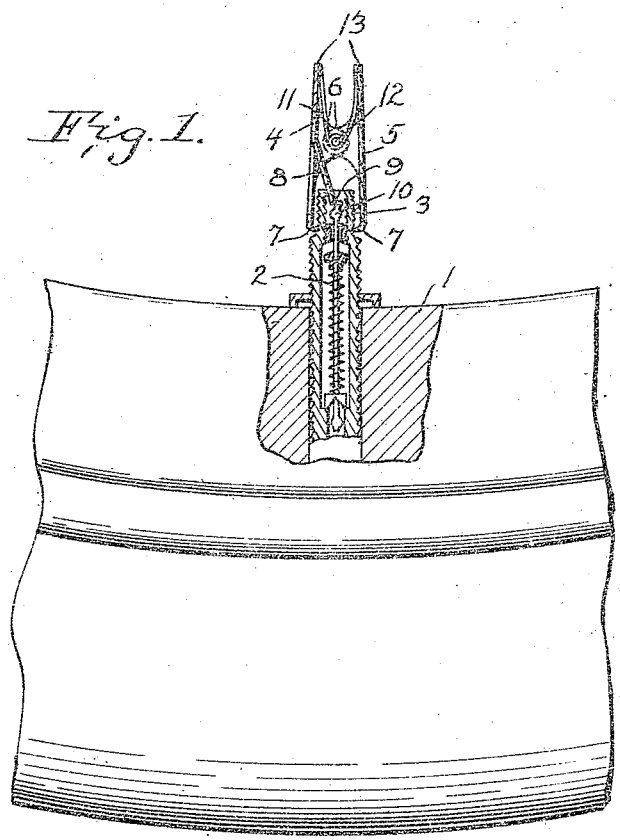
Figure 2:
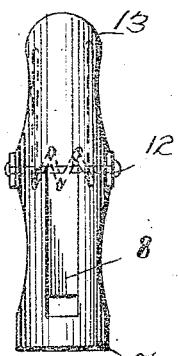

The foregoing and other objects may be attained by means of the construction illustrated in the accompanying drawing, in which, Figure 1 is a sectional view of a clasp connected to a check valve nipple and showing a portion of an automobile tire, Fig. 2 is a plan view of the clasp or tool for deflating the tire.

Referring to the drawing, the numeral 1 designates the nipple of a pneumatic tire and 2 is the check valve therein, while 3 is the threaded outer portion of the nipple.

The deflating tool or device consists of a clasp comprising two members 4 and 5 preferably made of sheet metal and provided with inwardly turned pintle bearings 6. The jaw members 7 of the clasp are turned inwardly and rounded to fit the threaded portion of the nipple, said rounded portions fitting in the threads so that they can be turned and moved inwardly and outwardly as required.

The member 4 of the clasp is provided with an integral tongue 8, the ends of which are bent angularly, as at 9 and said tongue is disposed practically in the center between the two members 4 and 5 to bear upon the stem 10 of the check valve and to hold the valve unseated while the tire is being deflated. A spiral spring 11 surrounds the pintle 12 and bears against the finger holds 13 upon their inner sides.

The operation of the invention will be readily understood from the foregoing. When the tool is engaged with the nipple, the tongue 8 is disposed in the center in line with the stem 10 of the check valve, and upon turning the clasp, the tongue bears upon the stem 10 and holds the valve unseated, while the air escapes.

The invention is simple in construction, can be readily placed in position for use, can be manufactured at low cost and is very efficient for its purpose.

Various changes may be made in the details of construction without departing from the spirit and scope of the invention as defined in the claim.

What is claimed is:—

The herein described tire deflating tool comprising a clasp consisting of two members pivotally connected together and provided with jaws and a spring for forcing the jaws together, said jaws being formed by flanges turned inwardly and rounded to fit the threads of a nipple, and an integral tongue cut from the body of one of the members of the clasp, said tongue being bent inwardly and downwardly and having its terminal end disposed centrally between said jaws to engage the stem of a check valve.

In testimony whereof I affix my signature in presence of two witnesses.

WILLIAM C. GUNNELL.

Witnesses:
R. H. MINTEER,
BESSE RICHEY.